(No Model.)
G. H. NEWELL.
FISH ROD REEL.
No. 527,713.  Patented Oct. 16, 1894.
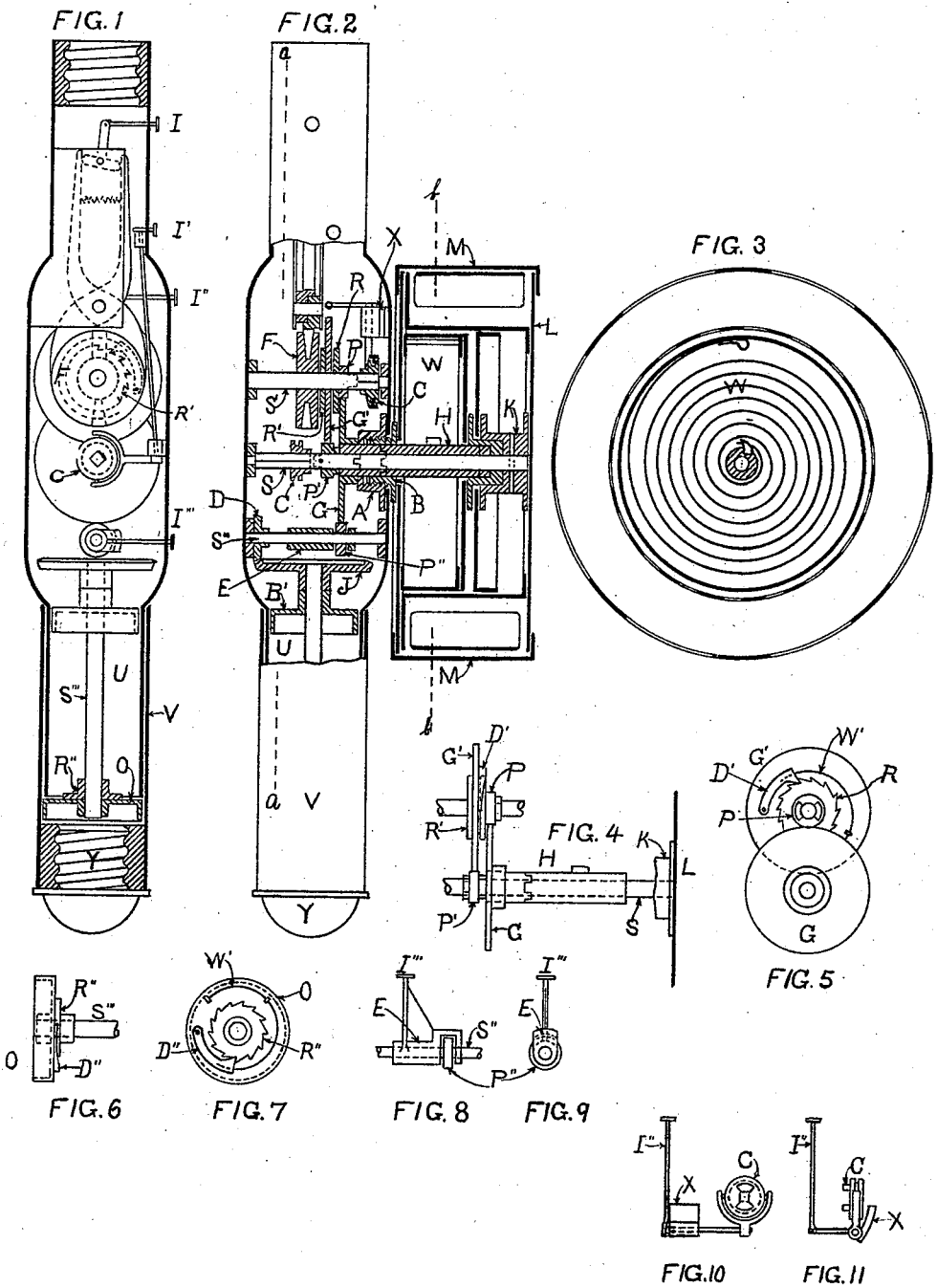
WITNESSES
Christopher Hondelink
M. Louise Wright
INVENTOR
George H Newell
By Edward Taggart
his ATTORNEY

UNITED STATES PATENT OFFICE.

GEORGE H. NEWELL, OF GRAND RAPIDS, MICHIGAN.

FISH-ROD REEL.

SPECIFICATION forming part of Letters Patent No. 527,713, dated October 16, 1894.

Application filed March 31, 1894. Serial No. 505,979. (No model.)

*To all whom it may concern:*

Be it known that I, GEORGE H. NEWELL, a citizen of the United States, residing at the city of Grand Rapids, in the county of Kent and State of Michigan, have invented certain new and useful Improvements in Fish-Rods and Reels, of which the following is a specification.

This invention relates to certain new and useful improvements in fish rods and reels, and in the mechanism for operating and controlling the movement of the reel both when controlled by the operation of the spring and when used as a free running reel; and the objects of my invention are, first, to produce a fish rod and reel having a reel seat which forms a section of the rod itself, and within which is contained the gearing and principal parts of the mechanism for conveying the power of the spring to the reel, and a spring and reel placed without the fishing rod or reel seat; that is, the placing of the spring mechanism, which conducts the power from the spring to the reel without the rod, within the rod or reel seat; second, to supply means for connecting and disconnecting the reel and spring from the rod without interfering with the mechanism within the reel seat; third, to enable the operator to use the reel as a free running reel without reference to the other mechanism; fourth, other objects more particularly described in the specification and referred to in the claims hereto attached. These objects are illustrated in the accompanying drawings, in which—

Figure 1 shows a longitudinal sectional view substantially on the line A—A of Fig. 2, with the exception of the reel operating mechanism, which is merely shown in side elevation. Fig. 2 shows a vertical sectional view on a line through the shaft of the reel. Fig. 3 shows a sectional view on line $b$—$b$ of Fig. 2. Fig. 4 shows a detached view of a portion of the reel, reel shaft, hollow shaft which surrounds the reel shaft, and the connecting parts for conveying the power from the spring through the mechanism within the reel seat and back again to the reel shaft. Fig. 5 shows a detached view of the mechanism which conveys the power from the cylindrical shaft to the supplementary shaft. Figs. 6 and 7 show detached portions of the winding mechanism. Figs. 8 and 9 show detached views of the coupling mechanism between the winding mechanism and the mechanism which operates the reel. Figs. 10 and 11 show detached views of coupling mechanism used for attaching and detaching pulley P and ratchet R to the shaft S'.

Similar letters refer to similar parts throughout the several views.

In the drawings I have shown the reel seat having an enlarged portion in order to contain the mechanism for conveying the power from the spring back to the reel. Instead, however, of having this part enlarged, it may be made cylindrical in form and uniform in size.

A represents a collar on the reel seat provided with internal screw-threads, and B a collar provided with external screw-threads, used merely for attaching the reel and external parts to the reel seat. Any suitable mechanism may be used for this purpose.

S represents the shaft of the reel, which shaft is attached to the reel by means of suitable connection shown by K.

L represents the reel proper supported on the shaft S and inclosed in the case M.

The construction of the reel and its case may be of any suitable form, but I have shown a reel of the ordinary construction.

Surrounding the reel shaft S is a tubular or cylindrical shaft H, which I will refer to as the "spring shaft" inasmuch as one end of the spring W is attached to this cylindrical tube H, and the other end is attached in any suitable manner to the frame-work which supports the spring. The spring is preferably an ordinary clock or watch spring, and attached in the ordinary manner of attaching such springs. Upon the shaft H is a cog wheel G, which cog wheel G engages with the wheel P on the shaft S'. The wheel P is connected with the ratchet wheel R—the general form of connection being shown in Figs. 4 and 5. A dog D' is supported upon the gearing G'.

The object of the connection between P, R and G', is to convey the power through this connection to the wheel G', as the force of the spring acts upon the shaft H. G' engages with the pinion P', which pinion, when the spring is acting on the reel, is rigidly attached to the shaft S. Thus, the power is conveyed from the spring through the shaft H, the cog wheel G, pinion P, ratchet R, cog wheel G', pinion P' and shaft S to the reel L, so that the power of the spring revolves the reel and winds thereon the line.

In connection with the shaft S', there is a clutch wheel F, made rigid with the shaft so as to revolve therewith. Between this wheel F and the wheel G', there is a ratchet wheel secured to G', and a dog secured to F, so that when revolved in one direction the wheel F will be carried with the wheel G', or carry with it the wheel G'; the pawl and ratchet allowing wheel G' to be moved in the other direction without in any manner affecting the wheel F. The wheel F is grooved, and fitting into the grooves are brakes, which brakes are formed with two arms pivoted together and provided with a spring for holding them in frictional contact with the groove in the wheel F. Said arms are journaled or fulcrumed on a pin 4 projecting from a plate $H^2$ secured in the reel seat. Between the upper ends of the said arms is arranged a cam or spreader $P^2$ pivoted to the plate $H^2$ and having rigidly secured thereto a lever $K^2$, to the upper end of which is pivotally secured a push rod I. By moving the push rod I the cam or spreader $P^2$ is turned so as to spread the two arms of the brake apart and releases or partially releases the brake from the friction wheel F, whereby the operation of the spring to revolve the reel can be checked or the check removed at the will of the user.

The spring may be wound as follows: V represents a shell which is adapted to rock or oscillate upon its support. To this section or shell V, is attached a collar O, provided with the dog spring W'. Passing through the collar O is the shaft S'''. On the shaft S''' is the ratchet wheel R'' and dog D' held in position by dog spring W'. These parts are shown in Figs. 1, 6, and 7. By turning the shell V in one direction, say to the right, the dog D'' engaging with the ratchet wheel R'' upon the shaft S''', revolves it, while the return movement of the shell would have no effect upon the shaft S'''. The movement is conveyed through the shaft S''' to the beveled wheel J, which beveled wheel engages with pinion wheel D, on shaft S'', thereby revolving shaft S'' and with it pinion P''', which conveys its motion to the cog wheel G and from thence to the shaft H, thereby revolving the shaft H in the proper direction to wind the spring W thereon. The motion which is conveyed to the wheel G in winding the spring, gives G a revolution in the opposite direction, which said wheel is only operated upon by the unwinding of the spring, and the connection between the wheel G, the pulley P and the ratchet wheel R and spring G', allows the wheel G to revolve without revolving or affecting the movement of the wheel G', the dog acting merely as a check upon the backward movement of the parts revolved through the rocking movement of the shell V.

When the operator desires to disconnect the winding mechanism, the pinion P'' is disconnected in the following manner: A yoke device shown in Figs. 8 and 9 by E, is sleeved upon the shaft S'' and engages with the pinion P''. Connected to this yoke device is the arm and pinion I''', by means of which the pinion P can be slid upon its shaft S'', thereby disconnecting P'' from cog wheel G, and thereby entirely disconnecting the winding mechanism from the other parts of the machinery.

Whenever it is desired to run the reel as a free reel, the connecting clutch shown by C' is withdrawn from its position, which locks the pinion P'' upon the shaft of the reel. This arrangement is shown in Figs. 1 and 2.

I'' is a push-rod connected through proper mechanism with the clutch C'. By depressing I, the clutch C' is thrown out so as to disengage the pinion P' from the shaft S, thereby allowing the reel with its shaft to revolve free, and thus making a free running reel.

In order to place the action of the spring entirely under control of the friction mechanism, the wheel P, ratchet wheel R, cog wheel G and friction wheel F are attached together so as to all revolve with the shaft S' in the following manner: The sliding clutch C, is supported upon the shaft S', and is controlled by a bell crank and lever mounted so that by depressing the push-rod shown by I'', the bell crank which is supported in a box X is turned, and the clutch C is moved in contact with the wheel P, and thereby connects P, R, G' and F to the shaft, so that all these parts are under control of the friction brake which operates upon the friction wheel F. By releasing the brake, when the parts are so connected, the pulling out of the line will revolve F, G', P' and G, thereby winding the spring; that is, as the line is run out, the spring will be wound, but the whole will be under control at all times of the friction brake, which can be so manipulated as to stop the movement of the line in either direction at the will of the user. This clutch C is only used when it is desirable to control the operation of the reel and spring entirely through the friction brake. When the clutch C is thrown back, the connection from the spring W, hollow shaft H, wheel G, pulley P, ratchet wheel R, wheel G' and pulley P', is the same as first above described, but the friction brake being in place to operate upon the friction wheel F as the line is pulled out, the dog and ratchet arrangement described will retain the line in whatever position it may be left after pulling it out; that is, the amount of line drawn out will be held in that position until the brake is released in order to allow the spring action to wind the same upon the reel. By this construction the operator can pull out so much of the line as he desires before making a cast, and he will be sure that it will not be withdrawn or wound upon the drum until he desires to manipulate the brake so as to allow the spring to operate in winding it in.

U represents the shell of the reel seat, and B' a journal support or bearing for the shaft G.

Having thus described my invention, what I claim to have invented, and desire to secure by Letters Patent, is—

1. In a fishing rod, the combination of a reel, a reel seat arranged within the rod a spring for operating the reel placed without the reel seat, in combination with mechanism within the reel seat, and suitable mechanism for conveying the power exerted by the tension of the spring from the shaft or sleeve to which the spring is attached to the shaft which revolves with the winding reel, substantially as described.

2. The combination of a reel, a shaft supporting said reel, a hollow shaft surrounding the reel shaft, a spring connected to said hollow shaft, and a reel seat arranged within the rod and suitable mechanism within the reel seat conveying the power exerted by the spring to the reel shaft and thence to the reel, substantially as described.

3. The combination of a reel, a reel seat arranged within the rod a shaft connected to the reel on which the same revolves, a hollow shaft surrounding the reel shaft, a spring attached thereto and adapted to exert a power thereon, mechanism for conveying the power exerted by the spring from its tubular shaft to the reel shaft, and suitable means for detaching the reel from the reel seat, substantially as described.

4. The combination of a reel, a reel seat arranged within the rod a shaft supporting the reel, a spring, a shaft to which the spring is attached, surrounding the reel shaft, all placed without the reel seat, gearing connecting the tubular shaft or spring shaft to a secondary shaft within the reel seat, suitable mechanism on the secondary shaft conveying the power exerted by the spring back to a pinion or gear on the reel shaft and thereby to the reel, substantially as described.

5. In combination with a reel, a reel seat arranged within the rod a spring placed without the reel seat, suitable mechanism within the reel seat for conveying the power exerted by the spring to the reel, a ratchet mechanism for connecting the power exerted by the spring to the mechanism which operates the reel, substantially as described.

6. The combination with the reel, and spring, and the mechanism for operating the reel through the spring, of a pawl and ratchet, and a frictional device adapted to prevent the spring from reeling in the line, but not to prevent the line from being withdrawn outwardly, substantially as described.

7. The combination with a reel, and a spring adapted to revolve the reel, of mechanism connecting the spring shaft with the reel shaft, and mechanism for locking the said connecting mechanism to a frictional device, whereby the whole may be locked or retained so as to prevent the spring from withdrawing the line while allowing the line to be pulled out freely against the action of the spring, substantially as described.

8. In combination with the mechanism for operating the reel from the spring, a grooved friction wheel, a friction clutch, and suitable mechanism for operating same, whereby the operation of the reel can be controlled, substantially as described.

9. In combination with a reel, a reel seat arranged within the rod a spring situated outside of the reel seat, and suitable mechanism within the reel seat for conveying the power from the spring to the reel, substantially as described.

10. The combination with a rod having arranged therein a reel seat, of a reel, a spring disposed within the reel, a shaft actuated by said spring, an oscillating shell, mechanism connecting said shell to the spring actuated shaft, and mechanism arranged within the reel seat for controlling the spring, substantially as described.

11. The combination with a rod having arranged therein a reel seat, of a reel, a spring disposed within the reel, a shaft actuated by said spring, a spring winding mechanism, means for connecting said spring actuated shaft and winding mechanism, a sliding clutch for attaching and detaching the winding mechanism and spring actuated shaft, and a spring controlling device arranged within the real seat, substantially as described.

In witness whereof I have hereunto set my hand and seal in the presence of two witnesses.

GEORGE H. NEWELL. [L. S.]

Witnesses:
EDWARD TAGGART,
CHRISTOPHER HONDELINK.